United States Patent
Muramatsu et al.

[11] Patent Number: 5,926,453
[45] Date of Patent: Jul. 20, 1999

[54] OPTICAL DISK HAVING FIRST AND SECOND RECORDING AREAS WITH WOBBLE FREQUENCIES THAT DO NOT INTERFERE WITH EFM SIGNAL

[75] Inventors: Eiji Muramatsu; Akiyoshi Inoue; Shoji Taniguchi; Hiroyuki Takahashi, all of Tokorozawa; Shigenori Murakami; Toshihiko Takishita, both of Koufu, all of Japan

[73] Assignees: Pioneer Electronic Corporation, Tokyo; Pioneer Video Corporation, Yamanashi-ken, both of Japan

[21] Appl. No.: 08/298,773

[22] Filed: Aug. 31, 1994

[30] Foreign Application Priority Data

Sep. 3, 1993 [JP] Japan .................................. 5-220321

[51] Int. Cl.$^6$ ........................................................ G11B 7/24
[52] U.S. Cl. .................................... 369/275.4; 369/275.3
[58] Field of Search .......................... 369/275.2, 275.1, 369/275.3, 275.4, 47, 48, 32, 54, 272

[56] References Cited

U.S. PATENT DOCUMENTS

| | | | |
|---|---|---|---|
| 4,769,802 | 9/1988 | Tatsduguchi | 369/275.3 |
| 4,940,618 | 7/1990 | Hamada et al. | 369/275.1 |
| 4,942,565 | 7/1990 | Lagadec | 369/59 |
| 5,204,852 | 4/1993 | Nakagawa et al. | 369/275.4 |
| 5,218,599 | 6/1993 | Tsuyoshi et al. | 369/275.4 |
| 5,315,400 | 5/1994 | Kurata et al. | 369/275.3 |
| 5,325,352 | 6/1994 | Matsumoto | 369/275.1 |

*Primary Examiner*—Tan Dinh
*Attorney, Agent, or Firm*—Kane, Dalsimer, Sullivan, Kurucz, Levy, Eisele and Richard, LLP

[57] ABSTRACT

A recordable optical disc on which information is recorded by applying a light beam on the surface thereof, includes: a first recording area on which information is recorded and reproduced while the disc is rotated at a first linear velocity; and a second recording area on which information is recorded and reproduced while the disc is rotated at a second linear velocity. The first recording area and the second recording area include guide grooves having wobble frequency lower than frequency band of EFM signal.

8 Claims, 4 Drawing Sheets

| | LINEAR VELOCITY [m/s] | WOBBLE FREQUENCY [kHz] |
|---|---|---|
| 1st AREA (CD) | 1.2~1.4 | 22.05 |
| 2nd AREA (VIDEO) | 11.4 | 22.05 |

|  | PCA, PMA | LEAD-IN AREA | PROGRAM AREA | LEAD-OUT AREA |
|---|---|---|---|---|
| RADIUS FROM DISC CENTER (mm) | 22.35 ~23 | 23~25 | 25~58 | 58~59 |

|  | LINEAR VELOCITY [m/s] | WOBBLE FREQUENCY [kHz] |
|---|---|---|
| 1st AREA (CD) | 1.2~1.4 | 22.05 |
| 2nd AREA (VIDEO) | 11.4 | 179.55 |

|  | LINEAR VELOCITY [m/s] | WOBBLE FREQUENCY [kHz] |
|---|---|---|
| 1st AREA (CD) | 1.2~1.4 | 22.05 |
| 2nd AREA (VIDEO) | 11.4 | 22.05 |

OPTICAL DISK HAVING FIRST AND SECOND RECORDING AREAS WITH WOBBLE FREQUENCIES THAT DO NOT INTERFERE WITH EFM SIGNAL

BACKGROUND OF THE INVENTION

1. Field of the Invention

The present invention relates to a recordable optical disc, and more particularly to a recordable optical disc suitable for recording signal according to CDV (Compact Disc Video) format.

2. Description of the Prior Art

Conventionally, there is CD (Compact Disc), known as a media for reproduction only, on which music information is recorded. There has recently been developed a recordable compact disc (CD-R:Recordable Compact Disc). Recording format of CD-R is generally referred to as "Orange Book", and it is in conformity with recording format of CD. FIGS. 1A and 1B illustrate physical format of CD-R. In CD-R, a lead-in area 4, a program area 5 and a lead-out area 6 are formed from inner circumference of the disc to outer circumference thereof, like the format of CD. In addition, in CD-R, a PCA (Power Calibration Area) 2 and a PMA (Power Memory Area) 3 are provided radially inwardly of the lead-in area 4, as illustrated.

Recording track on the R-CD is provided with guide groove that is wobbled by the frequency of a carrier of 22.05 kHz which is frequency-modulated by data indicating absolute time information (ATIP: Absolute Time In Pregroove). A laser beam for recording desired information is moved to follow the guide grooves under tracking servo control, and rotational speed of spindle motor which rotates the R-CD is controlled so that the wobbling guide groove pattern has a central frequency of 22.05 kHz. In this manner, tracking servo and spindle-motor servo controls can be effected on unrecorded R-CDs as well as recorded R-CDs.

The PCA 2 is an area where test recording is carried out prior to an actual information recording process, so that the power of the recording laser beam will be optimized for recording desired information in the information recording process. The PCA 2 is composed of a count area and a test area. The count area has a plurality of subareas corresponding respectively to a plurality of subareas of the test area, and each containing a suitable EFM signal recorded therein. Test recording for measuring an optimum recording laser beam power is carried out in the subareas of the test area. One of the subareas of the test area is consumed by a single test recording.

Any subarea of the test area which has once been used by test recording is not available for a next test recording. It is therefore necessary to search for an unused subarea positioned radially inwardly of the used subarea for use in the next test recording. The count area is provided to facilitate the searching process. More specifically, if suitable EFM signals have been recorded in certain subareas of the count area and no EFM signal has been recorded in a subarea next to those subareas, then unrecorded subarea indicates that the corresponding subarea of the test area is available for test recording. Consequently, that corresponding subarea of the test area may be searched for and test recording carried out therein for measuring an optimum recording laser beam power. After an optimum recording laser beam power has been measured in the subarea of the test area, the corresponding subarea of the count area is searched for, and a certain signal (EFM signal) is recorded in that subarea, indicating that test recording has already been conducted in the subarea of the count area.

The PMA 3 is an area for storing a recording history of information successively recorded in the program area. Specifically, start addresses and end addresses of track numbers recorded in the program area, for example, are recorded in the PMA 3 in the same format as the TOC information in the lead-in area.

The recording history of successively recorded information is stored in the PMA 3 for the following reasons: On a partially recorded disc, information may further be recorded in the remaining blank of the program area. Therefore, the information in the PMA 3 cannot be recorded in the lead-in area 4 until the completion of recording of all the desired information is finally indicated. Consequently, information about the tracks that have already been recorded is temporarily stored in the PMA 3. When the user or controller of the disc indicates that no more information will be recorded, the TOC information and a lead-out signal are recorded for the first time. At the time the recording is completed, the TOC information in the PMA 3 is transferred to the lead-in area 4 a plurality of times for improving reliability. The finalized disc (CD-R), on which the recording of all the necessary information is completed, is now in conformity with the CD format, and can be played back by an ordinary playback-only disc player which does not have an ATIP decoder for decoding the ATIP information. Not only the above-mentioned "Orange Book" but Japanese Patent Applications Nos. 3-23595 and 3-193218 disclose details of recording format of CD-R.

On the other hand, there is CDV (Compact Disc Video), known as application media of CD, which utilizes format of CD and LD (Laser Disc) in combination so as to record both audio and video signals on a unique disc. FIGS. 2A and 2B illustrate basic format of CDV. The CDV roughly includes an audio signal recording area positioned at inner circumferential portion of the disc for recording digital audio information and a video signal recording area positioned at outer circumferential portion of the disc for recording digital audio information and video information. The audio signal recording area includes a first lead-in area 11, a first program area 12 and a first lead-out area 13, and digital audio information for approximately 20 minutes is recorded according to the same format as CD. The video signal recording area includes a second lead-in area 14, a second program area 15 and a second lead-out area 16, and video information and digital audio information for approximately 5 minutes is recorded according to the same format as LD.

However, when CDV-format signal is actually recorded on the CD-R, a problem in respect to wobble frequency takes place due to difference of linear velocity of disc rotation between the audio signal recording area and the video signal recording area. When CD-R is divided into a first area (audio recording area) and a second area (video recording area) and signal according to CDV-format is to be recorded, a CLV servo is controlled at wobble frequency 22.05 kHz in the first area because the disc is rotated in the first area at linear velocity 1.2–1.4 m/s. However, in the second area according to CDV-format, linear velocity of disc rotation ranges 11–12 m/s, approximately 8 times of that in the first area, because frequency band width of video signal to be recorded is broad. Therefore, when a multiplexed signal of frequency-modulated video signal and a predetermined digital signal (EFM signal) is to be recorded in the second area at linear velocity 11.4 m/s, the wobble frequency f is required to be:

$$f = 22.05 \times 11.4/1.4 = 180 \text{ kHz}.$$

This means that the signal to be recorded interferes with the frequency band of EFM signal (196–720 kHz), and therefore it is impossible to record digital signal in the second area.

SUMMARY OF THE INVENTION

It is an object of the present invention to provide a recordable optical disc on which digital signal can be recorded in the video recording area without interference with the frequency band of EFM signal.

According to one aspect of the present invention, there is provided a recordable optical disc on which information is recorded by applying a light beam on the surface thereof, including: a first recording area on which information is recorded and reproduced while the disc is rotated at a first linear velocity; and a second recording area on which information is recorded and reproduced while the disc is rotated at a second linear velocity. The first recording area and the second recording area include guide grooves having wobble frequency lower than frequency band of EFM signal.

According to the present invention, recording area of CD-R is divided into a first recording area and a second recording area in which information is recorded and reproduced at different linear velocities, respectively, and the first and second recording areas include guide grooves that wobbles at a wobble frequency sufficiently lower than the band frequency of EFM signal. Therefore, digital signal to be recorded does not interfere with signal of EFM frequency band, and CDV-format signal can be recorded on CD-R disc.

DETAILED DESCRIPTION OF THE PREFERRED EMBODIMENT

A preferred embodiment of the present invention will be described below with reference to the accompanying drawings.

Recordable Optical Disc

Figures 1A, 1B:
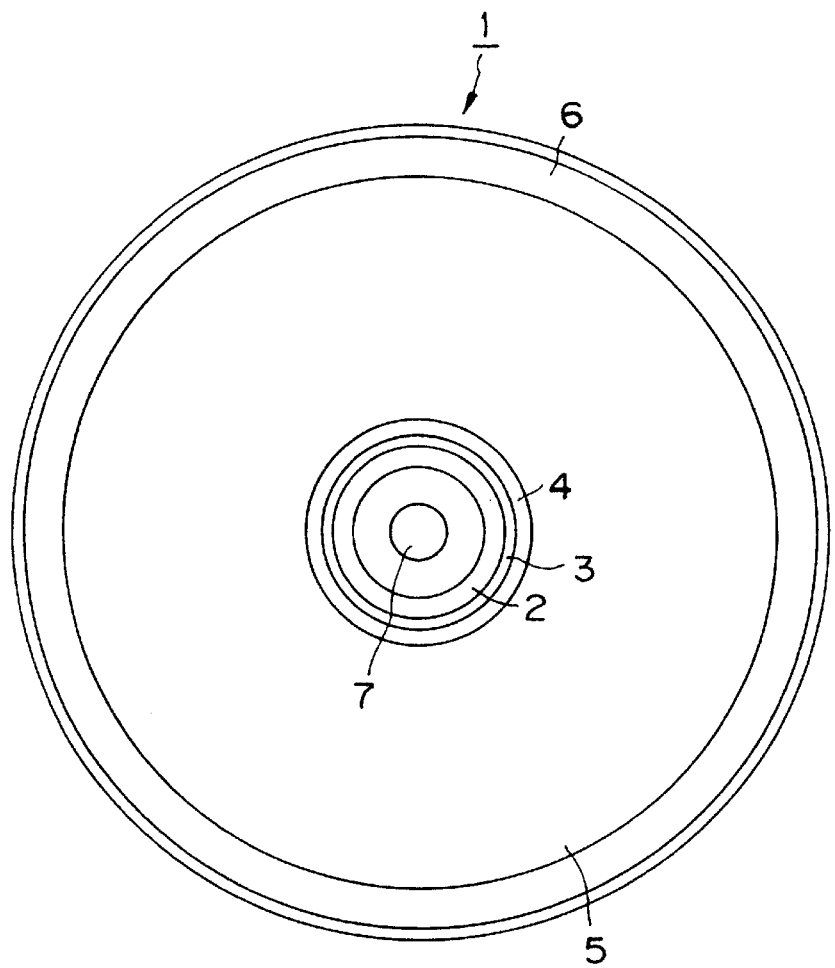
FIGS. 1A and 1B illustrate physical recording format of CD-R.
Figures 2A, 2B:
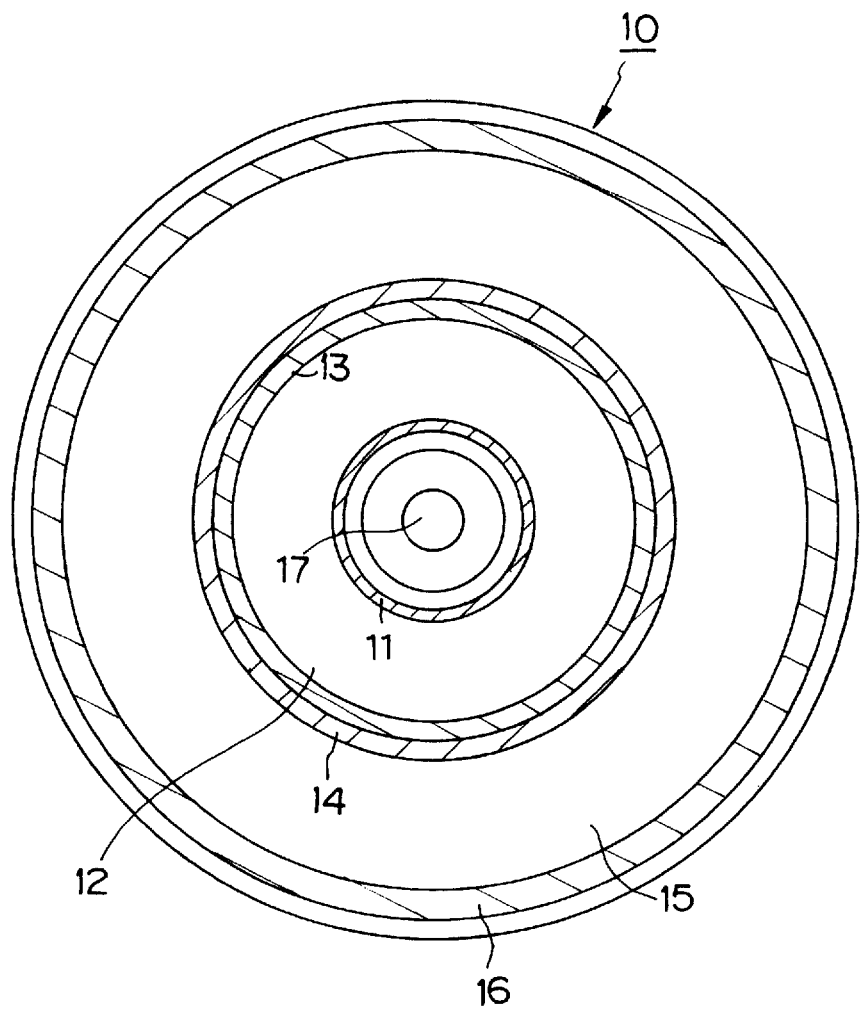
FIGS. 2A and 2B illustrate basic recording format of CDV.
Figures 3A, 3B:
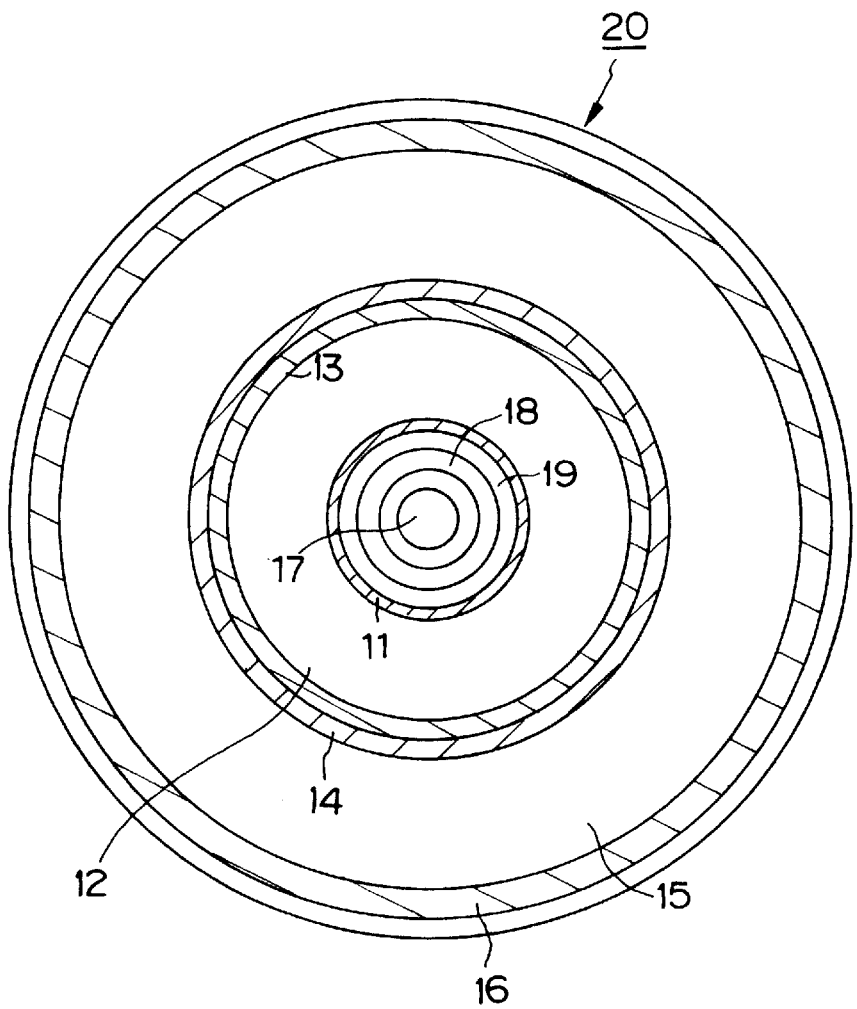
FIGS. 3A and 3B illustrate recording format of CDVR.

FIG. 3A illustrates recording format of an optical disc according to an embodiment of the present invention. An optical disc according to this format will be hereinafter referred to as "CDV-R". In FIG. 3A, an optical disc 20 is provided with a PCA 18, a PMA 19 and a first lead-in area 11, in the same manner as ordinary CD-R shown in FIG. 1A. In addition, in the optical disc 20, the program area 5 shown in FIG. 1A is divided into a first program area 12 and a second program area 15, and a first lead-out area 13 and a second lead-in area 14 are provided at the border of the first program area 12 and the second program area 15. Here, an area including the first lead-in area 11, the first program area 12 and the first lead-out area 13 is defined as "first area". The first area corresponds to the audio signal recording area according to CDV format, and is rotated at linear velocity 1.2–1.4 m/s (hereinafter referred to as "first linear velocity") An area including the second lead-in area 14, the second program area 15 and the second lead-out area 16 is defined as "second area". The second area corresponds to the video signal recording area according to CDV format, and is rotated at linear velocity 11–12 m/s (hereinafter referred to as "second linear velocity"). Further, in the second area, guide groove for rotation control is formed in a manner that wobble frequency of guide groove becomes equal to 22.05 kHz, like the first area. As has been described, in an ordinary CD-R, wobble frequency in an area corresponding to the second area is approximately 180 kHz which may interfere with frequency band of EFM signal. On the contrary, this embodiment is characterized in that the wobble frequency in the second area is determined to be 22.05 kHz. Therefore, according to this embodiment, digital signal to be recorded does not interfere with the wobble signal, and digital signal can be recorded in the second area.

Next, preferable concrete value of the wobble frequency will be examined. In view of the above concept, any frequency that does not interfere with the signal of EFM frequency band may be used as the wobble frequency in the second area. It is confirmed from experiments that, if the wobble frequency is determined to be no more than 22.05 kHz, it does not interfere with the EFM signal.

CDV-R Recording Apparatus

Figure 4:
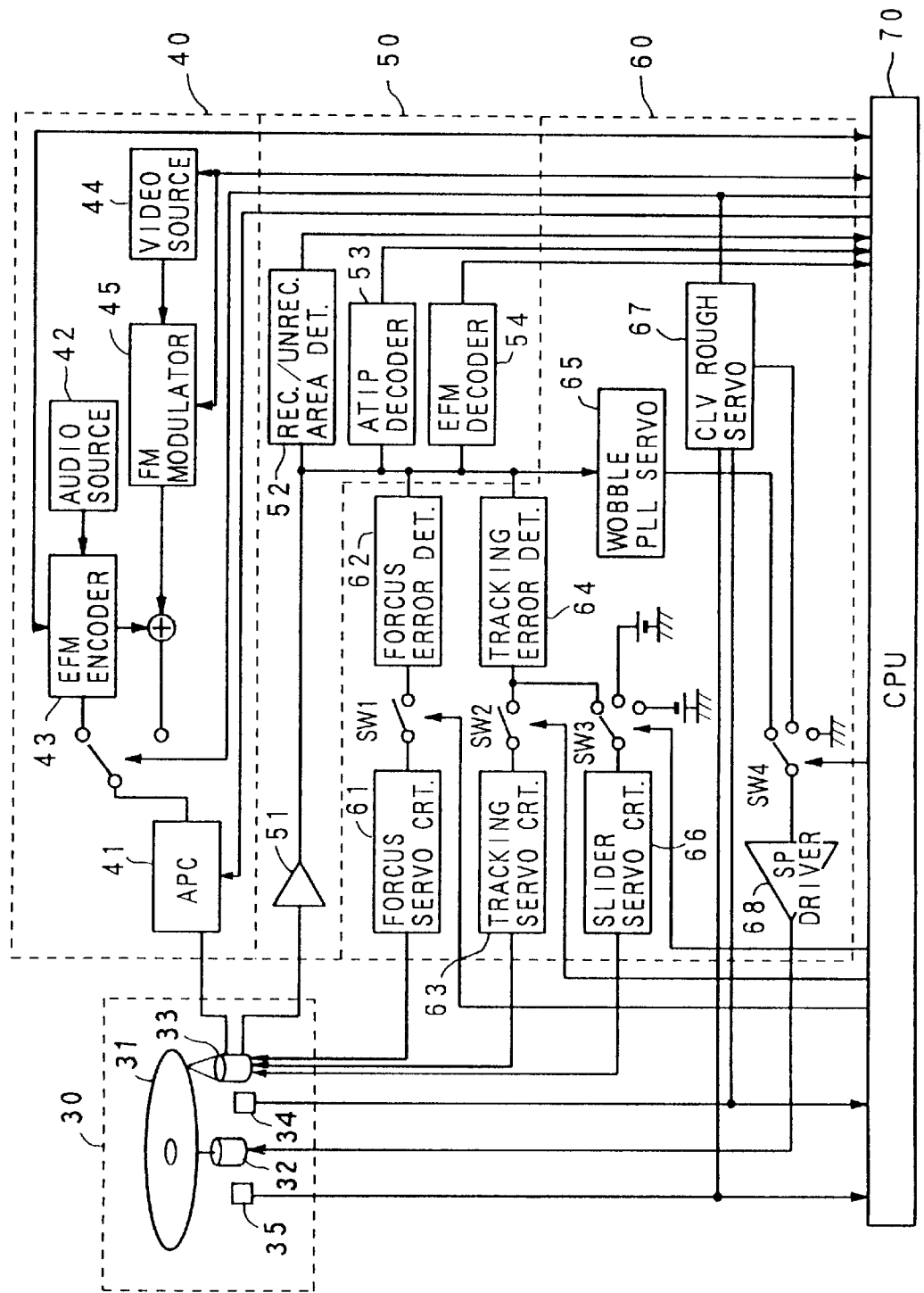
FIG. 4 is a block diagram illustrating a construction of a CDV-R recording apparatus according to the present invention.

Next, description will be given which is directed to an apparatus for recording audio and video information according to CDV format onto the above-described CDV-R. FIG. 4 illustrates a construction of information recording apparatus according to an embodiment of the present invention. In FIG. 4, CDV-R recording apparatus roughly includes a disc reproducing system 30, a recording system 40, a signal processing system 50, a servo system 60 and a CPU 70. The disc reproducing system 30 includes a disc (CDV-R) 31 on which signal is recorded, a spindle motor 32 for rotating the disc, a pickup 33 for reading out signal recorded on the disc, a position sensor 34 for detecting position of the pickup 33 in the radial direction of the disc 31 and an oscillator (FG) 35 for generating signal corresponding to the rotation frequency of the disc 31. The recording system 40 includes an APC (Auto Power Control) circuit 41 for controlling recording power and reproducing power of the pickup 33, an audio source 42 for generating audio signal to be recorded, an EFM (Eight to Fourteen Modulation) encoder 43 for conducting EFM modulation onto the signal supplied from the audio source 42, a video source 44 for generating video signal to be recorded and an FM modulator 45 for conducting FM modulation onto the video signal supplied from the video source 44. The signal processing system 50 includes an RF amplifier 51 for amplifying RF signal read out by the pickup 33, a recorded/unrecorded area detecting circuit 52 for detecting recorded area and unrecorded area of the disc 31 based on the amplified RF signal, an ATIP decoder 53 for demodulating ATIP signal from wobble signal obtained from the amplified RF signal and an EFM decoder 54 for conducting EFM demodulation onto the RF signal. The servo system 60 includes a focus servo system, a tracking servo system, a slider servo system and a spindle servo system. The focus servo system includes a focus error detecting circuit 62, a switch SW1 and a focus servo circuit 61. The tracking servo system includes a tracking error detecting circuit 64, a switch SW2 and a tracking servo circuit 63. The slider servo system includes a switch SW3 and a slider servo circuit 66. The spindle servo system includes a wobble PLL servo circuit 65, a CLV rough servo circuit 67, a switch SW4 and a spindle driver 68. The CPU 70 is connected to the disc reproducing system 30, the recording system 40, the signal processing system 50 and the servo system 60, and performs total control of these systems.

Next, an operation of the CDV-R recording apparatus will be described. Firstly, basic operation of the servo systems will be described. When the disc 31 is placed at an appropriate position, the pickup 33 is transferred to the most inner circumference of the disc 31, and the focus servo system commences focus servo control. Accordingly, light spot of the light beam emitted from the pickup 33 becomes focused state. Then, rough servo control for spindle motor 32 is carried out. Namely, based on signal output from the FG 35 and positional information output from the position sensor 34, the CLV rough servo circuit 67 controls the spindle driver 68 to rotate the spindle motor 32. The position sensor 34 detects whether the pickup 33 is in the first area of the CDV-R disc 31 or in the second area thereof. The frequency of the output signal of the FG 35 is compared with a first reference frequency when the pickup 33 is in the first area, and is compared with a second reference frequency when the pickup 33 is in the second area. The difference obtained in the comparison is operated as FG error signal. The first reference frequency corresponds to the linear velocity (1.2–1.4 m/s) in the first area of CDV while the second reference frequency corresponds to the linear velocity (11–12 m/s) in the second area of the CDV. The FG error signal indicates a difference between the reference frequency and the actual rotation frequency of the disc 31, and when the FG error signal is converged into zero, the rough servo becomes locked state. By the rough servo control described above, the spindle motor 32 rotates at the linear velocity corresponding to the first or second reference frequency.

Next, the tracking error detecting circuit 64 outputs tracking error signal based on the RF signal. The tracking servo circuit 63 makes the light beam follow the pregrooves on the recording surface of the CD-R on the basis of the tracking error signal. As has been described above, the pregroove on the recording surface of CD-R wobbles so that the center frequency of the wobbling becomes 22.05 kHz, and therefore a wobble signal is obtained from the pregroove. The wobble signal thus read is supplied to the ATIP decoder 53 and the wobble PLL servo circuit 65. Then, the switch SW4 is turned over from the CLV rough servo circuit side to the wobble PLL servo circuit side, and the wobble PLL servo is carried out so that the center frequency of wobbling becomes 22.05 kHz. When the wobble servo system is locked, the spindle motor 32 rotates so that the linear velocity becomes equal to the first or second linear velocity. In addition, the wobble signal includes FM-modulated ATIP information, and the ATIP decoder 53 supplies absolute time information and disc code information to the CPU 70.

Next, an operation of recording information onto the CDV-R disc according to the embodiment of the present invention will be described. Firstly, an operation of recording audio information onto the first area according to CD-format will be described.

When instruction to record audio information is issued by the CPU 70, the pickup 33 is transferred to the PCA 18 (see. FIG. 3A) provided at most inner circumference of the disc 31, and an optimum recording power is determined by a test recording performed there. Then, the pickup 33 is transferred to the PMA 19, and it is judged whether audio information has already been recorded on the disc 31 or not. Specifically, the recorded/unrecorded area detecting circuit 52 detects presence or absence of audio information recorded on the PMA 19 based on the read RF signal. If audio information has been recorded, the ATIP decoder 53 discriminates until when in the ATIP time audio information has been recorded. If it is judged that audio information has already been recorded, the pickup 33 is transferred to a recordable area (beginning of the unrecorded area) in the first program area 12. Alternatively, if it is judged that no information has been recorded, the pickup 33 is transferred to most inner circumferential area of the first program area 12, that is, to a head portion of unrecorded area.

Next, the EFM encoder 43 conducts EFM encoding onto the audio signal output from the audio source 42 on the basis of the CD-format. The EFM pulse signal is transmitted to the APC circuit 41. The APC circuit 41 controls output of the optical pickup 33 on the basis of the EFM pulse signal to record information on the surface of the disc 31. Subsequently, it is judged whether all of the audio signal is recorded or not. If any of the audio signal still remains unrecorded, the above-described operation is repeated. When all of the audio signal is recorded, information relating to the history of the recorded audio signal is recorded in the PMA 19 as EFM signal, and the recording operation is ended. As a result, the audio signal output from the audio source 42 is recorded in the first program area 12 according to CD-format in conformity with the standard of CDV.

Next, an operation of recording LD-format video signal and audio signal (hereinafter simply referred to as "video signal") on the second area of CDV-R will be described. When the CPU 70 issues instruction to record video information, the pickup 33 is transferred to the PCA 18 and an optimum recording power is determined. Then, the CPU 70 recognizes recording condition of the PMA 19, and the pickup 33 is transferred to the second program area 15. Subsequently, the CPU 70 discriminates whether the groove in the second program area 15 is DC groove or not. If yes, the CPU 70 leads the spindle motor 32 to locked state using the CLV rough servo. If it is DC groove, no ATIP information is recorded. Therefore, the recorded/unrecorded area detecting circuit 52 discriminates recording condition and detects unrecorded area, and the CPU 70 transfers the pickup 33 to the unrecorded area thus detected. Alternatively, if it is judged that the groove is not DC groove, the CPU 70 leads the spindle motor 32 to locked state using the wobble PLL servo, determines recording start position by referring to the ATIP information obtained from the RF signal, and transfers the pickup 33 to the recording start position thus determined.

Subsequently, the FM modulator 45 modulates the video signal supplied from the video source 44 by FM modulation in accordance with the LD-format, mixes the FM-modulated signal with the EFM signal supplied from the EFM encoder 43, and supplies the mixed signal to the APC circuit 41. The APC circuit 41 controls the pickup 33 based on the signal thus input, and records video signal. When the recording of the video signal is completed, the CPU 70 transfers the pickup 33 to the PMA 19 to record information relating to the history of the video signal thus recorded, and ends the recording operation. By this operation, video signal output from the video source 44 and audio signal output from the audio source 42 are recorded in the second program area 15 within the second area of the CDV-R shown in FIG. 3A according to the LD-format which is in conformity with the standard of CDV.

When the audio signal is recorded in the first area and the video and audio signals are recorded in the second area, lead-in area and lead-out area are formed on the disc according to the CDV-format, and the disc is finalized. Details of the finalizing operation, forming lead-in area and lead-out area, etc. is disclosed in Japanese Patent Publication No. 5-22992. Since the finalized disc thus produced is in conformity with CDV-format, it can be reproduced by an ordinary CDV player or an optical disc player having CDV playback capability.

What is claimed is:

1. A recordable optical disc on which information is recorded by applying a light beam on the surface thereof, comprising:
   a first recording area on which information is recorded and reproduced while the disc is rotated at a first linear velocity; and
   a second recording area on which information is recorded and reproduced while the disc is rotated at a second linear velocity, each of the first recording area and the second recording area comprising guide grooves having a wobble frequency free from interference with a frequency band of an EFM signal.

2. A recordable optical disc according to claim 1, wherein said wobble frequency is no more than 22.05 kHz.

3. A recordable optical disc according to claim 1, wherein the first recording area is located inner circumferential side of the disc and the second recording area is located outer circumferential side of the disc.

4. A recordable optical disc according to claim 1, wherein the first recording area stores audio information according to recording format of Compact Disc, and the second recording area stores audio and video information according to recording format of Laser Disc.

5. A recordable optical disc on which information is recorded by applying a light beam on the surface thereof, comprising:
   a first recording area on which information is recorded and reproduced while the disc is rotated at a first linear velocity; and
   a second recording area on which information is recorded and reproduced while the disc is rotated at a second linear velocity, the first recording area comprising guide grooves having a wobble frequency free from an interference with a frequency band of an EFM signal when said disc is rotated at the first linear velocity, and the second recording area comprising guide grooves having a wobble frequency free from interference with the frequency band of the EFM signal when said disc is rotated at the second linear velocity.

6. A recordable optical disc according to claim 5, wherein said wobble frequency is no more than 22.05 kHz.

7. A recordable optical disc according to claim 5, wherein the first recording area is located at an inner circumferential side of the disc and the second recording area is located at an outer circumferential side of the disc.

8. A recordable optical disc according to claim 5, wherein the first recording area stores audio information according to recording format of Compact Disc, and the second recording area stores audio and video information according to recording format of Laser Disc.

* * * * *